US010273352B2

(12) United States Patent
Amino et al.

(10) Patent No.: US 10,273,352 B2
(45) Date of Patent: Apr. 30, 2019

(54) PNEUMATIC TIRE

(75) Inventors: Naoya Amino, Hiratsuka (JP);
Yoshihiro Kameda, Hiratsuka (JP);
Kazuto Yamakawa, Hiratsuka (JP);
Akitomo Sato, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 656 days.

(21) Appl. No.: 11/832,933

(22) Filed: Aug. 2, 2007

(65) Prior Publication Data

US 2008/0223494 A1 Sep. 18, 2008

(30) Foreign Application Priority Data

Aug. 3, 2006 (JP) ................................. 2006-212165

(51) Int. Cl.
*B60C 1/00* (2006.01)
*B60C 11/00* (2006.01)
*C08L 19/00* (2006.01)
*C08L 21/00* (2006.01)
*C08K 3/04* (2006.01)
*C08K 3/36* (2006.01)
*C08K 5/00* (2006.01)
*C08K 3/013* (2018.01)

(52) U.S. Cl.
CPC .......... *C08L 19/006* (2013.01); *B60C 1/0016* (2013.01); *C08L 21/00* (2013.01); *C08K 3/013* (2018.01); *C08K 3/04* (2013.01); *C08K 3/36* (2013.01); *C08K 5/0016* (2013.01)

(58) Field of Classification Search
CPC ......... B60C 1/00; B60C 1/0016; B60C 11/00; B60C 11/0008; B60C 11/0041
See application file for complete search history.

(56) References Cited

U.S. PATENT DOCUMENTS 4,478,266 A * 10/1984 Pierson ................. B60C 1/0016
152/209.5
5,049,610 A * 9/1991 Takaki et al. ............... 152/209.4
5,705,137 A * 1/1998 Goerl .................... C01B 33/193
423/335
6,057,397 A 5/2000 Takagishi et al.
6,097,397 A 5/2000 Takagishi et al.
6,242,522 B1 * 6/2001 Ezawa ................. B60C 1/0016
152/151
6,252,008 B1 * 6/2001 Scholl et al. ............... 525/333.5
6,523,585 B1 2/2003 Ducci et al.
7,000,661 B2 * 2/2006 Segatta et al. ................ 152/170
7,001,946 B2 * 2/2006 Steiner et al. ................ 524/496
7,122,586 B2 * 10/2006 Sandstrom et al. .......... 523/344
2005/0234182 A1 10/2005 Kunisawa
2005/0277717 A1 * 12/2005 Joshi ........................ B60C 1/00
524/261

FOREIGN PATENT DOCUMENTS

| EP | 0 806 452 A | 11/1997 |
|---|---|---|
| EP | 806452 | * 11/1997 |
| EP | 0 847 880 A | 6/1998 |
| EP | 1 340 787 A | 9/2003 |
| EP | 1 571 009 A | 9/2005 |
| EP | 1676878 | * 7/2006 |
| EP | 1 686 152 A | 8/2006 |
| EP | 1 788 020 A1 | 5/2007 |
| JP | 2000-273240 A | 10/2000 |
| JP | 2001-106830 A | 4/2001 |
| JP | 3488926 B2 | 11/2003 |
| JP | 2004-175993 A | 6/2004 |
| JP | 2005-248021 A | 9/2005 |
| JP | 1663994 A | 9/2005 |
| JP | 2006-137857 A | 6/2006 |
| JP | 2006-188571 A | 7/2006 |
| WO | WO-96/23027 A1 | 8/1996 |
| WO | WO-2005/118705 A1 | 12/2005 |
| WO | WO-2006/028254 A1 | 3/2006 |

OTHER PUBLICATIONS

Examiner's Search Report on EP 07113698.0.

* cited by examiner

*Primary Examiner* — Justin R Fischer
(74) *Attorney, Agent, or Firm* — Polsinelli PC

(57) ABSTRACT

A pneumatic tire using as a tread part, a rubber composition containing a high silica-content rubber composition having a difference F-S between an amount of filler F and an amount of a softening agent S of 60 to 90 parts by weight and having a durometer hardness measured at 20° C. of 65 to 76.

1 Claim, No Drawings

PNEUMATIC TIRE

TECHNICAL FIELD

The present invention relates to a pneumatic tire, more particularly relates to a pneumatic tire having improved wet performance due to the higher content and higher dispersion of silica and due to the resultant higher physical properties.

BACKGROUND ART

The wet performance of a tire is one of the most important characteristics. Demands for improving the wet performance remain high. As such a technique, silica-containing compounds have been used, but further higher content and higher dispersion of silica and resultant higher physical properties are being sought. In the past, as the means for raising the dispersion of silica, the art of using a terminally modified polymer is known in the following Patent Documents 1 to 5 etc., but techniques for further raising the physical properties are being sought for high silica-content rubber compositions for pneumatic tires.

Patent Document 1: Japanese Patent No. 3488926
Patent Document 2: Japanese Patent Publication (A) No. 2000-273240
Patent Document 3: Japanese Patent Publication (A) No. 2004-175993
Patent Document 4: Japanese Patent Publication (A) No. 2005-248021
Patent Document 5: Japanese Patent Publication (A) No. 2001-106830

SUMMARY OF THE INVENTION

Accordingly, the object of the present invention is to provide a pneumatic tire having, particularly, improved wet performance due to higher content and higher dispersion of silica and due to the resultant higher physical properties, in a silica-containing rubber composition for a tire.

In accordance with the present invention, there is provided a pneumatic tire using, as a tread part, a rubber composition comprising a high silica-content rubber composition having a difference F-S between an amount of a filler F and an amount of a softening agent S of 60 to 90 parts by weight and having a durometer hardness, measured at 20° C., of 65 to 76.

Further, in accordance with the present invention, there is provided a pneumatic tire using, as a tread, a rubber composition comprising a hydroxy group-containing diene-based rubber having an aromatic vinyl content of 15 to 50% by weight, a 1,2-vinyl bond content of a conjugated diene of 10 to 80% by weight and a glass transition temperature of −50° C. to −10° C., in an amount of 100 to 30 parts by weight based upon 100 parts by weight of diene-based rubber, silica in an amount of 40 to 120 parts by weight and a softening agent such as a process oil, liquid polymer, in an amount of 0.1 to 15 parts by weight, having a difference F-S between an amount of a filler F such as silica, carbon black and an amount of a softening agent S of 60 to 90 parts by weight, and having a durometer hardness, measured at 20° C., of 65 to 76.

According to the present invention, by using the above-mentioned specific high silica-content rubber composition, it is possible to obtain a pneumatic tire particularly having an improved wet performance.

BEST MODE FOR CARRYING OUT THE INVENTION

In the present invention, the inventors engaged in in-depth research on increasing the dispersion and improving the physical properties in a high silica-content rubber composition for a pneumatic tire, whereupon the inventions discovered that realization was possible by a rubber composition having a difference F-S between an amount of silica and/or carbon black filler F and an amount of softening agent S contained in the high silica-dispersed rubber composition of 60 to 90 parts by weight and a durometer hardness, measured at 20° C., of 65 to 76.

That is, according to the present invention, to obtain a high silica-content rubber composition used, as the tread part of a pneumatic tire, in particular having an improved wet performance, there is proposed a rubber composition, where a difference F-S of an amount of silica and/or carbon black filler F contained in the rubber composition and an amount of softening agent S is 60 to 90 parts by weight, preferably 63 to 87 parts by weight, more preferably 65 to 83 parts by weight and a type A durometer hardness measured at 20° C., based on JIS K6253, is 65 to 76, preferably 66 to 75, more preferably 67 to 74. Here, if the difference F-S is less than 60 parts by weight, the wet performance is insufficient, while conversely if more than 90 parts by weight, the mixability/processability deteriorates. Further, if the durometer hardness is less than 65, the block rigidity at the tire-road surface is too low, sufficient traction cannot be obtained, and the wet performance deteriorates, while conversely if more than 76, the rubber becomes too hard, sufficient traction on fine relief shapes on the road surface cannot be obtained, whereby the wet performance deteriorates.

The silica usable in the present invention is not particularly limited, but dry-process white carbon, wet-process white carbon, colloidal silica, precipitated silica or any other silica conventionally used for a rubber composition may be used. Among these, wet-process white carbon (or wet silica) containing hydrous silicic acid as a main ingredient is preferable. These silicas may be used alone or in any combinations of two or more types. The specific surface area of the silica is not particularly limited, but the lower limit of the nitrogen adsorption specific surface area (BET method) is preferably 50 m$^2$/g, more preferably 100 m$^2$/g, particularly preferably 120 m$^2$/g, while the upper limit is preferably 400 m$^2$/g, more preferably 220 m$^2$/g, particularly preferably 190 m$^2$/g. If within this range, the mechanical properties, abrasion resistance, low heat buildup property, etc. are superior, and, therefore, this is preferable. Note that the nitrogen adsorption specific surface area is the value measured by the BET method based on ASTM D3037-81. The pH of the silica is preferably acidic, that is, less than pH7.0, but a pH of 5.0 to 6.9 is more preferable.

When the rubber composition for a tire of the present invention contains silica as a filler, if adding a silane coupling agent, the low heat buildup property and abrasion resistance are further improved, and, therefore, this is preferable. The silane coupling agent usable in the present invention is not particularly limited, but vinyl triethoxysilane, β-(3,4-epoxycyclohexyl)ethyl trimethoxysilane, N-(β-aminoethyl)-γ-aminopropyl trimethoxysilane, bis(3-(triethoxysilyl)propyl)tetrasulfide, bis(3-(triethoxysilyl)propyl) disulfide, γ-trimethoxysilylpropyldimethylthiocarbamyl tetrasulfide, γ-trimethoxysilylpropylbenzothiazyl tetrasulfide or other tetrasulfides etc. may be mentioned. As the silane coupling agent, since scorching at the time of mixing can be avoided, those having four or less sulfur atoms in the molecule is preferred. These silane coupling agents may be used alone or in any mixture of two or more types. The lower limit of the amount of the silane coupling agent based upon the weight of the silica is preferably 0.1% by weight per weight of silica, more preferably 1% by weight, particularly preferably 2% by weight, while the upper limit is preferably 30% by weight, more preferably 20% by weight, particularly preferably 10% by weight.

Further, as the carbon black usable in the present invention, furnace black, acetylene black, thermal black, channel black, graphite or any other carbon black which has been conventionally compounded into rubber compositions for tires may be used. Among these, furnace black is preferably used from the viewpoint of a high reinforcability. As specific examples, SAF, ISAF, ISAF-HS, ISAF-LS, IISAF-HS, HAF, HAF-HS, HAF-LS, FEF or other grades may be mentioned. These carbon black may be used alone or in any combination of two or more types. The specific surface area of the carbon black is not particularly limited, but the lower limit of the nitrogen adsorption specific surface area (BET method) is preferably 5 $m^2/g$, more preferably 50 $m^2/g$, particularly preferably 80 $m^2/g$, while the upper limit is preferably 200 $m^2/g$, more preferably 180 $m^2/g$, particularly preferably 150 $m^2/g$. If the nitrogen adsorption specific surface area is within this range, the mechanical properties and abrasion resistance are superior and, therefore, this is preferred. Further, the dibutyl phthalate (DBP) adsorption of the carbon black is not particularly limited, but the lower limit is preferably 5 ml/100 g, more preferably 60 ml/100 g, particularly preferably 80 ml/100 g, the upper limit is preferably 300 ml/100 g, more preferably 160 ml/100 g, particularly preferably 150 ml/100 g. If the DBP adsorption is within this range, the mechanical properties and abrasion resistance are superior, and, therefore, this is preferred.

Further, as a softening agent usable in the present invention, a rubber process oil or a weight average molecular weight 1000 to 100000 low molecular weight polymer, sesame oil, rapeseed oil or other vegetable oil, rosin or petroleum-based resin etc. may be used. A rubber process oil is usually the high boiling point part of petroleum fractions and is classified by chemical structure of the hydrocarbon molecule into paraffin-based oils composed of chain saturated hydrocarbons, naphthene-based oils composed of saturated cyclic hydrocarbons and aromatic-based oils composed of unsaturated cyclic hydrocarbons. Usually, these are classified by the viscosity-constant gravity (hereinafter referred to as "VCG"). Generally, those having a VCG of 0.790 to 0.849 are classified as paraffin-based, those having a VCG of 0.850 to 0.899 as naphthene based and those having a VCG of 0.900 or more as aromatic based. Among these, to sufficiently improve the low heat buildup property, the use of an aromatic oil is preferable. An aromatic oil having a VCG of 0.930 or more is particularly preferable. Further, a so-called T-DAE oil obtained by hydrogenation of the insolubles at the time of solvent extraction of the heavy fractions obtained by vacuum distillation of crude oil may be used. As a low molecular weight polymer, styrene-butadiene copolymer, polybutadiene, polyisoprene, polyisobutylene, ethylene-propylene copolymer, etc. having a weight average molecular weight 1000 to 100000 is suitably used. As the vegetable oil, sesame oil, rapeseed oil, soybean oil, castor oil, etc. may be mentioned. As a resin, terpene resin, rosin, modified rosin, coumarone-indene resin, blown asphalt, C5-based petroleum resin, C9-based petroleum resin, polystyrene resin, etc. may be mentioned.

As a means for obtaining the high silica-content rubber composition satisfying the above-mentioned essential requirements of the present invention, it is possible to use a diene-based rubber containing a hydroxy group-containing diene-based rubber having an aromatic vinyl content of 15 to 50% by weight, having a 1,2-vinyl bond content of the conjugated diene of 10 to 80% by weight, and having a glass transition temperature of −50° C. to −10° C., in an amount of 100 to 30 parts by weight, more preferably 100 to 40 parts by weight, and add, based upon 100 parts by weight of the rubber, the silica in an amount of 40 to 120 parts by weight, preferably 42 to 118 parts by weight, more preferably 46 to 117 parts by weight and a softening agent such as a process oil, liquid polymer, in an amount of 0.1 to 15 parts by weight, more preferably 1 to 13 parts by weight.

The hydroxy group-containing diene-based rubber usable in the present invention is a known rubber, for example, can be obtained by copolymerization of an aromatic vinyl monomer having primary, secondary or tertiary hydroxy groups and a conjugated diene-based monomer or conjugated diene monomer or other copolymerizable monomer or by copolymerization of an aromatic vinyl monomer and a conjugated diene-based monomer or conjugated diene-based monomer or other copolymerizable monomer to produce a diene-based polymer having an active metal bonded in the molecule, then reacting this with a modifying agent as ketones, ethers, aldehydes and epoxys or the like to introduce the primary, secondary or tertiary hydroxy groups into the diene-based polymer. In this way, the hydroxy group-containing diene-based rubber used in the present invention is a conjugated diene-based rubber having at least one hydroxy group in a molecule. The hydroxy group-containing rubber can be produced in a manner disclosed in, for example, WO 96/23027 and is also commercially available as NS 616 from Nippon Zeon Corporation. The preferable hydroxy group-containing diene-based rubber is a hydroxy end-modified solution polymerized styrene-butadiene copolymer.

In the present invention, a diene-based rubber usually used as a rubber composition for a tire may be included in an amount of, for example, 0 to 70 parts by weight more preferably 5 to 65 parts by weight, based upon the total amount of the hydroxy group-containing diene-based rubber. As the diene-based rubber, for example, natural rubber (NR), various types of butadiene rubber (BR), various types of styrene-butadiene copolymer rubber (SBR), polyisoprene rubber (IR), acrylonitrile-butadiene copolymer rubber (NBR), chloroprene rubber, ethylene-propylene-diene copolymer rubber, styrene-isoprene copolymer rubber, styrene-isoprene-butadiene copolymer rubber, isoprene-butadiene copolymer rubber, etc. may be mentioned. These diene-based rubber are used alone or in any combination of two or more types, together with the hydroxy group-containing diene-based rubber.

The above-mentioned hydroxy group-containing diene-based rubber is preferably an aromatic vinyl-conjugated diene copolymer. If the aromatic vinyl content is less than 15% by weight, the 1,2-vinyl bond content in the conjugated diene is less than 10% by weight and the Tg is lower than −50° C., the wet performance becomes insufficient, while conversely if the aromatic vinyl content is 50% by weight, the 1,2-vinyl bond content in the conjugated diene is over 80% by weight and the Tg is higher than −10° C., the rubber becomes too hard under ordinary temperature and conversely the wet performance deteriorates. Further, if the hydroxy group-containing diene-based rubber contained in the diene-based rubber is less than 30 parts by weight, the effect of said hydroxy group-containing diene-based rubber becomes insufficient. Further, if the amount of said silica is less than 40 parts by weight, the effect of improvement of the wet performance becomes insufficient, while conversely if more than 120 parts by weight, the mixability/processability deteriorates. Further, if the amount of the rubber use softening agent is over 15 parts by weight, the rubber deteriorates in physical properties, so the wet performance becomes insufficient.

The rubber composition for a pneumatic tire of the present invention may further contain therein a vulcanization or cross-linking agent, vulcanization or cross-linking accelerator, an antioxidant, reinforcing filler or other various types of compounding agents compounded into tire use rubber compositions. These compounding agents may be mixed by a general method to form a rubber composition, which may then be vulcanized or cross-linked. The amounts of these compounding agents may be made the conventional general amounts insofar as not running counter to the object of the present invention.

EXAMPLES

A standard Example, Examples and Comparative Examples will now be used to further explain the present invention, but the scope of the present invention is, of course, not limited to these Examples.

Test Method

1) Durometer hardness test: The type A durometer hardness was measured at 20° C., based on JIS K6253 using a rubber composition obtained according to a formulation shown in the following Table I.

2) Wet braking test: Tires having a size of 205/55R16 using a rubber composition obtained according to the formulation shown in the following Table I for the tread part were fabricated, mounted on a car with a displacement of 2500 cc and equipped with ABS, and tested for wet braking performance on a road surface wet with water. The distance until stopping from the start of braking at an initial speed of 100 km/hour was measured. The results are indicated indexed to the Standard Example as 100. The greater the value, the better the braking performance.

Standard Example, Examples 1 to 4, and Comparative Examples 1 to 3

The results are shown in Table I.

TABLE I

|  | Standard Ex. | Ex. 1 | Comp. Ex. 1 | Comp. Ex. 2 | Comp. Ex. 3 | Ex. 2 | Ex. 3 | Ex. 4 |
|---|---|---|---|---|---|---|---|---|
| Formation |  |  |  |  |  |  |  |  |
| SBR1[1] |  | 80 |  |  |  |  | 80 | 80 |
| SBR2[2] | 80 |  | 80 | 80 | 80 | 80 |  |  |
| SBR3(S')[3] | 24 | 24 | 24 | 24 | 24 | 24 | 24 | 24 |
| Carbon black (F)[4] | 8 | 8 | 8 | 8 | 8 | 8 | 8 | 43 |
| Silica (F)[5] | 75 | 75 | 57 | 75 | 92 | 75 | 75 | 40 |
| Stearic acid[6] | 1 | 1 | 1 | 1 | 1 | 1 | 1 | 1 |
| Zinc oxide[7] | 2.5 | 2.5 | 2.5 | 2.5 | 2.5 | 2.5 | 2.5 | 2.5 |
| Antioxidant[8] | 3 | 3 | 3 | 3 | 3 | 3 | 3 | 3 |
| Paraffin wax[9] | 1.5 | 1.5 | 1.5 | 1.5 | 1.5 | 1.5 | 1.5 | 1.5 |
| Silane coupling agent[10] | 2.8 | 6 | 6 | 6 | 6 | 6 | 6 | 6 |
| Oil(S)[11] | 27 | 5 | 5 | 5 | 5 | 5 | 5 | 5 |
| Vulcanization accelerator 1[12] | 1.9 | 1.7 | 1.7 | 1.7 | 1.7 | 1.7 | 1.7 | 1.7 |
| Vulcanization accelerator 2[13] | 0.5 | 2 | 2 | 2 | 2 | 2 | 2 | 2 |
| Sulfur[14] | 1.8 | 1.2 | 1.2 | 1.2 | 1.2 | 1.2 | 1.2 | 1.2 |
| F-S | 52 | 74 | 56 | 74 | 91 | 74 | 74 | 74 |
| Physical Properties/Characteristics |  |  |  |  |  |  |  |  |
| Hardness | 68 | 68 | 66 | 78 | Extrusion impossible | 75 | 65 | 76 |
| Brake performance (index) | 100 | 105 | 97 | 97 | Extrusion impossible | 101 | 102 | 101 |

Notes
[1] NS 616 (made by Nippon Zeon), hydroxy group end-modified SBR, styrene amount = 21% by weight, vinyl amount = 70% by weight, Tg = −22° C.;
[2] NS 116 (made by Nippon Zeon), amino group end-modified SBR, styrene amount = 21% by weight, vinyl amount = 70% by weight, Tg = −22° C.;
[3] Tufdene 1524 (made by Asahi Kasei Chemicals), styrene amount = 18% by weight, vinyl amount = 10% by weight, Tg = −65° C., 20 parts by weight oil extended;
[4] Seast 7HM (made by Tokai Carbon);
[5] Zeosil 1165MP (made by Rhodia), wet silica, moisture content 6.6% by weight;
[6] Beads Stearic Acid (made by NOF);
[7] Zinc White Type 3 (made by Seido Chemical Industry);
[8] SANTOFLEX 6PPD (made by FLEXSYS);
[9] Sannoc (made by Ouchi Shinko Chemical Industrial);
[10] Si 69 (made by Degussa);
[11] Process X-140 (made by Japan Energy);
[12] Noccelar CZ (made by Ouchi Shinko Chemical Industrial);
[13] Sansera D-G (made by Sanshin Chemical Industry);
[14] Gold Flower brand oil-treated sulfur powder (made by Tsurumi Chemical)

According to Table I, it is learned that the wet performance is improved in a pneumatic tire using a rubber composition satisfying the requirements according to the present invention.

The invention claimed is:

1. A pneumatic tire using, as a tread part, a high silica-content rubber composition consisting essentially of:
   (a) a rubber,
   (b) a filler F consisting of silica and carbon black,
   (c) a softening agent S,
   (d) stearic acid,
   (e) zinc oxide
   (f) an antioxidant
   (g) a paraffin wax, and
   (h) a silane coupling agent,
wherein the silica is contained in an amount of 40 to 102 parts by weight, based upon 100 parts by weight of the rubber,
said composition having a difference F-S between an amount of silica and carbon black filler F and an amount of a softening agent S of 74 to 87 parts by weight and having a durometer hardness, measured at 20° C., of 65 to 76, wherein
   (i) the rubber comprises 100 to 30 parts by weight, based upon 100 parts of the rubber, of a hydroxyl group end-modified solution polymerized styrene-butadiene copolymer (SBR) having (a) an aromatic vinyl content of 15 to 50% by weight, (b) a 1,2-vinyl bond content of a conjugated diene of 10 to 80% by weight and (c) a glass transition temperature of −50° C. to −10° C., wherein said hydroxyl group end-modified solution polymerized styrene-butadiene copolymer (SBR) is prepared by copolymerization of styrene and butadiene to produce styrene-butadiene copolymer (SBR) having an active metal bonded in the molecule, then reacting the SBR having an active metal bonded in the molecule with a modifying agent selected from the group consisting of ketones, ethers, aldehydes and epoxies to introduce primary, secondary or tertiary hydroxy groups into the SBR thereby providing the hydroxyl group end-modified solution polymerized styrene-butadiene copolymer (SBR);
   (ii) the softening agent S is contained in an amount of 0.1 to 15 parts by weight, based upon 100 parts by weight of the rubber;
   (iii) the filler F consists of silica and carbon black; wherein the silica has a nitrogen adsorption specific surface area (BET method) of 50 $m^2/g$ to 400 $m^2/g$ and the carbon black has a nitrogen adsorption specific surface area (BET method) of 50 $m^2/g$ to 180 $m^2/g$ and a dibutyl phthalate (DBP) adsorption of 60 ml/100 g to 150 ml/100 g; and
   (iv) the softening agent S is selected from the group consisting of a rubber process oil, a low molecular weight polymer having a weight average molecular weight of 1000 to 100000, terpene resin, rosin, modified rosin, coumarone-indene resin, blown asphalt, polystyrene resin, C5-based petroleum resin and C9-based petroleum resin.

\* \* \* \* \*